United States Patent [19]
Burrows

[11] Patent Number: 5,221,473
[45] Date of Patent: Jun. 22, 1993

[54] FILTER CARTRIDGE ASSEMBLY FOR A REVERSE OSMOSIS PURIFICATION SYSTEM

[76] Inventor: Bruce D. Burrows, 25581 Via Paladar, Valencia, Calif. 91355

[21] Appl. No.: 979,406

[22] Filed: Nov. 19, 1992

Related U.S. Application Data

[63] Continuation of Ser. No. 688,855, Apr. 22, 1991, which is a continuation-in-part of Ser. No. 420,929, Oct. 13, 1989, Pat. No. 5,037,547.

[51] Int. Cl.$^5$ ............................................. C02F 1/44
[52] U.S. Cl. ................................ 210/232; 210/257.2; 210/266; 210/282; 210/321.83; 210/314; 210/317
[58] Field of Search ............... 210/232, 266, 256, 314, 210/257.2, 317, 282, 321.83, 438, 440, 443, 450

[56] References Cited

U.S. PATENT DOCUMENTS

| | | | |
|---|---|---|---|
| 3,504,796 | 4/1970 | Bray | 210/266 |
| 3,542,199 | 11/1970 | Bray | 210/137 |
| 3,966,616 | 6/1976 | Bray | 210/450 |
| 4,160,738 | 7/1979 | Guter | 210/232 |
| 4,595,500 | 6/1986 | Galbiati | 210/266 |
| 4,609,463 | 9/1986 | Macevicz et al. | 210/257.2 |
| 4,642,192 | 2/1987 | Heskett | 210/638 |
| 4,650,586 | 3/1987 | Ellis, III | 210/257.2 |
| 4,678,565 | 7/1987 | Norton | 210/257.2 |
| 4,711,723 | 12/1987 | Bray | 210/266 |
| 4,713,175 | 12/1987 | Bray | 210/266 |
| 4,714,546 | 12/1987 | Solomon et al. | 210/266 |
| 4,743,366 | 5/1988 | Burrows | 210/257.2 |
| 4,776,952 | 10/1988 | Burrows | 210/257.2 |
| 4,781,830 | 11/1988 | Olsen | 210/232 |
| 4,834,873 | 5/1989 | Burrows | 210/257.2 |
| 4,839,037 | 6/1989 | Bertelsen et al. | 210/232 |
| 4,913,808 | 4/1990 | Haque | 210/266 |
| 4,936,985 | 6/1990 | Hahn . | |
| 5,037,547 | 8/1991 | Burrows | 210/257.2 |

Primary Examiner—Peter Hruskoci
Assistant Examiner—Robert James Popovics
Attorney, Agent, or Firm—Kelly, Bauersfeld & Lowry

[57] ABSTRACT

A filter cartridge is provided for use in a reverse osmosis water purification system or the like. The filter cartridge includes a reverse osmosis membrane for converting a feed water inflow to a relatively purified water supply having contaminants substantially removed therefrom, and a reject water supply having contaminants concentrated therein. The cartridge is configured as a single unit adapted for simple drop-in installation into an open-ended cartridge housing, wherein the housing is adapted for facilitated assembly with a cap having the requisite flow ports for connection to the cartridge as an incident to mounting of the cap onto the housing.

8 Claims, 4 Drawing Sheets

FILTER CARTRIDGE ASSEMBLY FOR A REVERSE OSMOSIS PURIFICATION SYSTEM

BACKGROUND OF THE INVENTION

This application is a continuation of application Ser. No. 07/688,855, filed Apr. 22, 1991 which is a continuation-in-part of copending U.S. Ser. No. 07/420,929 filed Oct. 13, 1989, now U.S. Pat. No. 5,037,547.

This invention relates generally to improvements in water purification systems and equipment of the reverse osmosis type. More particularly, this invention relates to an improved filter cartridge for a reverse osmosis purification unit, wherein one or more filter stages including a reverse osmosis membrane are integrated into a compact and unitary cartridge form adapted for simplified installation and replacement on an as needed periodic basis.

Reverse osmosis water purification systems are, in general terms, relatively well known in the art for producing a relatively purified water supply used for drinking, cooking, etc. Such purification systems commonly include a reverse osmosis unit having a reverse osmosis membrane which, in the presence of appropriate flow and pressure conditions, separates an incoming tap or feed water supply into the purified water supply and a relatively impure or reject water supply. In particular, the membrane functions to remove particulate matter and a wide range of dissolved solids and other contaminants from a portion of the feed water to produce the purified water supply, and to concentrate those contaminants within the remainder of the feed water thereby producing the reject supply, sometimes referred to as brine, for disposal via a suitable drain. The purified water supply is normally collected for storage at a convenient location within a suitable reservoir, and for ready dispensing through a faucet valve or the like when desired. In this regard, available reverse osmosis systems may be designed to utilize compressed air to deliver purified water from the reservoir as described, for example, in U.S. Pat. No. 4,834,873. Alternately, the system may be designed to use the pressure of the feed water to deliver purified water from the reservoir as described, for example, in U.S. Pat. No. 4,776,952.

Reverse osmosis membranes have been constructed from different materials which are known to provide different performance efficiency and rate of production of purified water. However, in many reverse osmosis systems, the choice of membrane material is dictated not by performance efficiency but instead by the chemical or bacteriological makeup of the feed water in a local water supply. For example, so-called thin film or thin film composite membranes are generally preferred in view of relatively high operational efficiencies which can be obtained from highly compact membrane cartridges having a large membrane surface area, substantially without degradation in the presence of certain bacterial organisms present in some feed water supplies. However, such thin film membranes are known to degrade rapidly in the presence of certain chemicals, particularly oxidants such as chlorine and/or compounds thereof which are often added to a local water supply to retard growth of bacteria and other organisms. Accordingly, when chlorine is present in the feed water supply, alternative and less efficient membrane materials such as cellulose acetate have normally been used to provide acceptable membrane operating life, but with an acknowledged reduction in pure water production rate and a relatively high susceptibility to bacterial attack. Alternatively, in some systems, carbon prefilters or the like have been used upstream of a thin film membrane to remove chlorine from the feed water supply prior to reverse osmosis processing. While this latter approach can prevent premature failure of the thin film membrane, it has also required additional filter housing and filter element structures to increase the overall size and cost of a reverse osmosis system.

Moreover, the use of the reverse osmosis membrane inherently requires appropriate membrane housing and associated plumbing connections to handle three separate water flows. Specifically, the membrane housing and plumbing connections must accommodate connection of the feed water to the membrane, as well as flow of the purified and reject water supplies from the membrane. In the past, the reverse osmosis membrane has been provided in a cartridge form with a view toward facilitated cartridge replacement on a periodic basis, but the requisite trio of plumbing connections must be disconnected and then properly reconnected in the course of a cartridge replacement procedure. Prior reverse osmosis systems have not provided any optimally simplified housing structure for quickly and easily disconnecting and then accurately reconnecting the plumbing connections in a substantially fail-safe, error-free manner.

The present invention overcomes the problems and disadvantages associated with the prior art by providing an improved filter cartridge for a reverse osmosis system, wherein the filter cartridge may include a compact membrane of the thin film type in combination with a prefilter stage which protects the membrane against contact with otherwise harmful constituents within the local water supply. Moreover, the present invention provides a simplified reverse osmosis membrane cartridge in association with a simplified housing and related plumbing connections adapted for easy cartridge replacement, when desired.

SUMMARY OF THE INVENTION

In accordance with the invention, an improved filter cartridge is provided for use in a reverse osmosis purification system, wherein the filter cartridge may incorporate dual filter stages into a single easily replaceable unit. In the preferred form, the cartridge includes a first filter stage having a filter medium for removing contaminants from an incoming feed or tap water supply, and a second filter stage including a reverse osmosis membrane. The filter medium of the first stage is designed to remove contaminants which would otherwise be potentially harmful to the reverse osmosis membrane, such that a so-called thin film or thin film composite membrane can be used without concern for the specific contaminants present in a local water supply. In an alternative preferred form, the cartridge includes a reverse osmosis membrane in the absence additional filter stages.

In either preferred form, the cartridge is adapted for relatively quick and easy drop-in or slide-in installation into a matingly shaped housing for a reverse osmosis unit. As is known in the art, the reverse osmosis unit is installed within a water purification system to receive an incoming flow of feed water, and to separate the feed water into a relatively purified water supply having contaminants removed therefrom and a relatively impure or reject water supply having contaminants concentrated therein. A housing cap which may be constructed as a unitary component is designed for simple removal from and re-installation onto the housing, wherein the cap defines feed water inflow and purified and reject water outflow ports connected operationally with the cartridge as an incident to cap installation.

In the dual stage form, the filter cartridge includes the first and second stages carried about a common central support tube for series flow-through passage of the incoming feed water. More particularly, the first filter stage comprises a generally cylindrical canister mounted about the support tube and defining apertured opposite ends for flow-through passage of the feed water. The filter medium is contained within the canister and comprises a material selected to attract, remove, or react with one or more target contaminants from the feed water. As one example, the filter medium may comprise activated carbon designed to remove chlorine and its compounds from a chlorinated feed water supply. Alternatively, other types of filter media can be used and/or combined, such as oxidation reduction media as described in U.S. Pat. No. 4,642,192.

The treated feed water exits the canister of the first filter stage and then passes into and through the second stage comprising a reverse osmosis membrane. This membrane is formed by wrapping thin film layers to form an elongated yet compact tubular structure which is fitted snugly about the central support tube at a downstream end of the first filter stage. The feed water flows into one axial end of the reverse osmosis membrane for appropriate separation into the purified and reject water supplies when appropriate system pressures are maintained. The reject water exits the membrane at an opposite axial end thereof, whereas the purified water passes radially inwardly through the membrane layers and further through flow ports in the support tube to the support tube interior. From the support tube, the purified water is connected in turn for flow to a suitable reservoir for storage and/or to a faucet valve or the like for dispensing.

In the single stage form, the upstream filter stage is omitted whereby the reverse osmosis membrane may be elongated to fit into the housing, or the housing suitably shortened to accommodate the reduced membrane length.

In accordance with one aspect of the invention common to the dual and single stage cartridges, the purified water and the reject water are routed to a multiported cap mounted on the housing at a common end of the filter cartridge. In this regard, in the preferred form, the purified water is routed through the central support tube which extends through the cartridge to a pure water outlet connected therewith when the cap is mounted on the housing. The reject water is similarly routed through a bleed conduit extending through the cartridge support tube to a reject water outlet connected wherewith when the cap and housing are assembled. The cap further defines a feed water inlet coupled to the membrane when the cap and housing are assembled. Appropriate seal means such as O-ring seals are provided to isolate the water flows from each other, and further to permit simple slide-fit installation of the filter cartridge into the reverse osmosis housing and for proper connection of the cartridge to the water inlet and outlets upon assembly of the cap with the housing.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
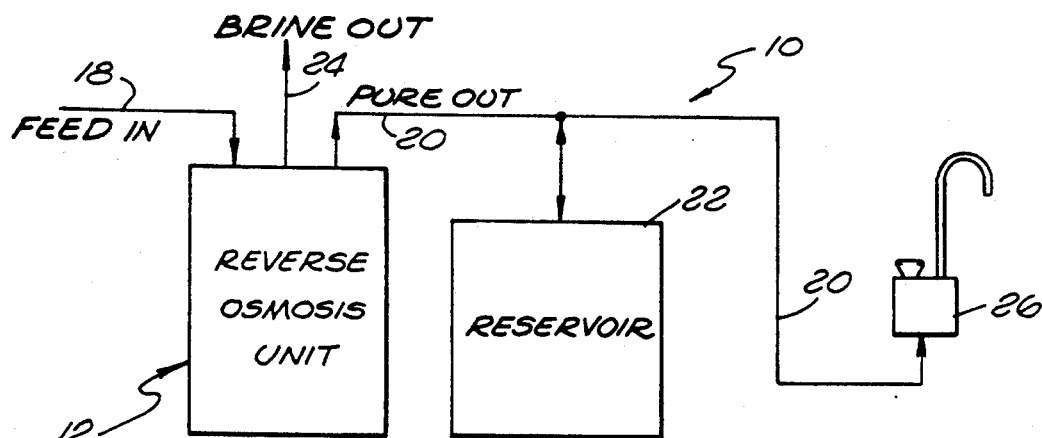
FIG. 1 is a schematic diagram representing an exemplary water purification system of the reverse osmosis type.
Figure 2:
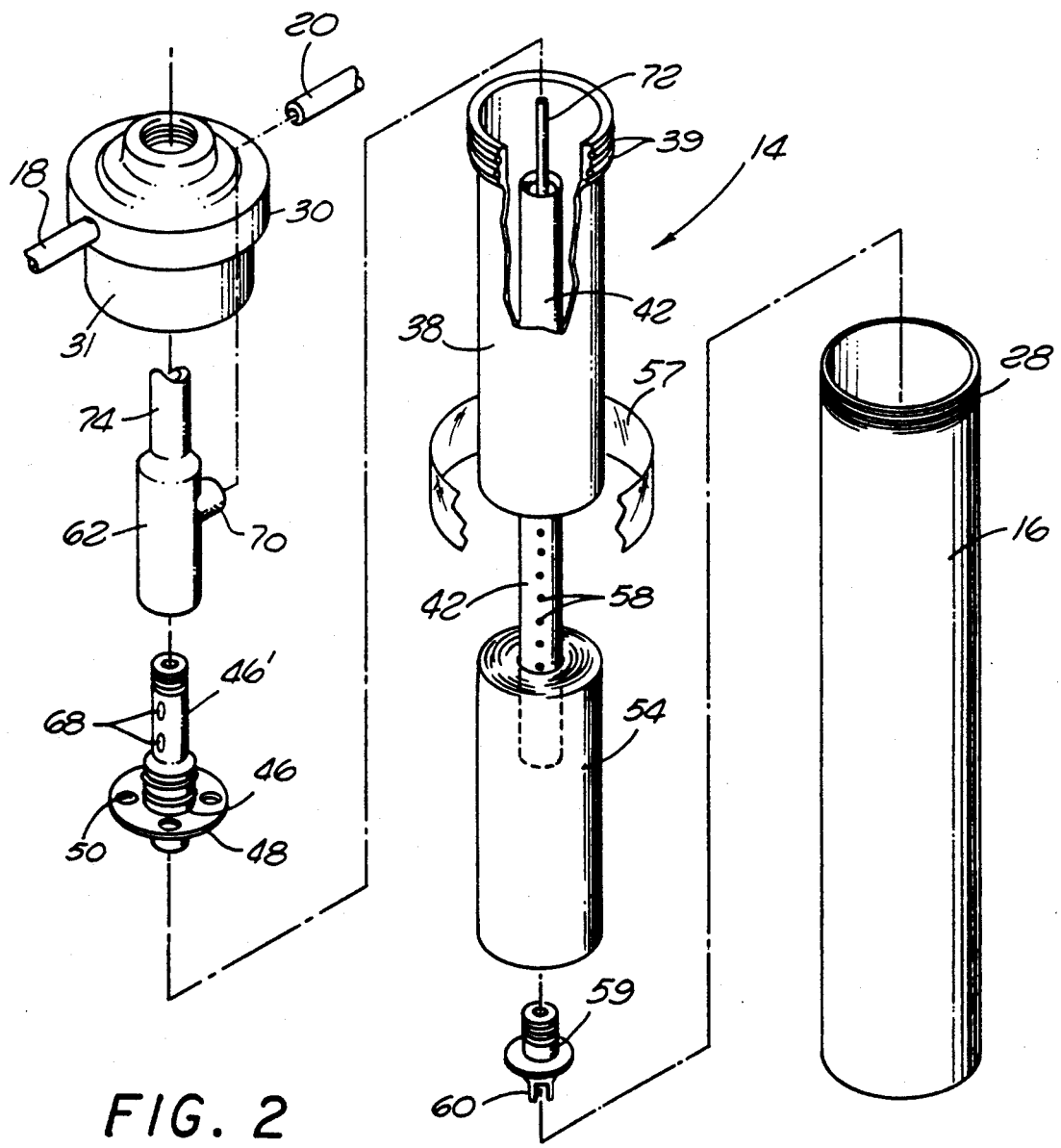
FIG. 2 is an exploded perspective view depicting components of a reverse osmosis unit for use in the system of FIG. 1, wherein the unit includes an improved dual stage filter cartridge embodying the novel features of the invention.
Figure 3:
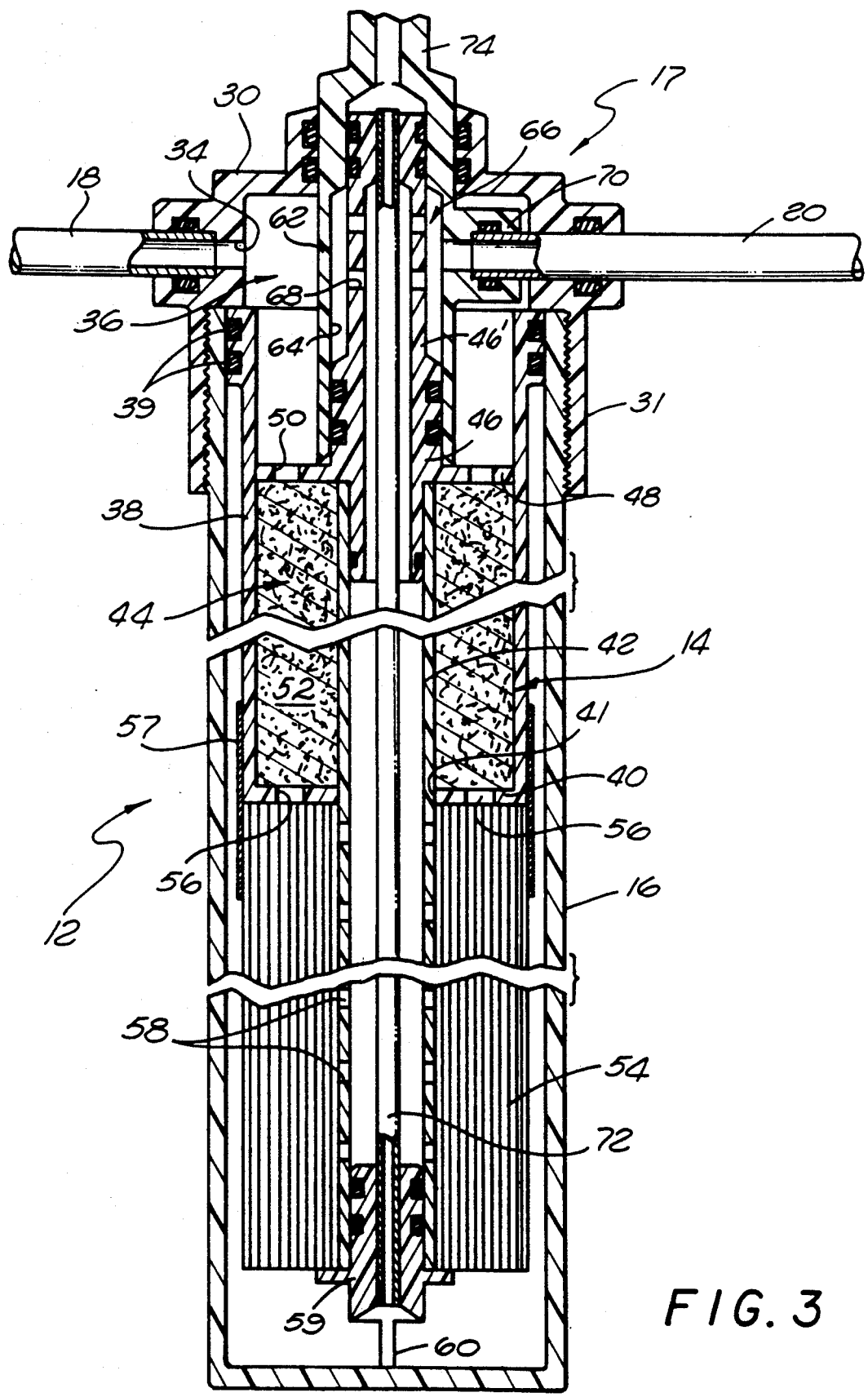
FIG. 3 is a fragmented vertical sectional view illustrating the reverse osmosis unit in assembled form.

As shown in the exemplary drawings, a water purification system referred to generally in FIG. 1 by the reference numeral 10 includes a reverse osmosis unit 12 equipped with an improved filter cartridge 14 (FIGS. 2 and 3). This dual cartridge 14 is constructed, in one preferred form, to include a reverse osmosis membrane of compact and economical design in combination with a prefilter for isolating and protecting the membrane from contact with selected contaminants which may be present in an incoming tap or feed water supply. The cartridge 14 is designed for simple slide-fit installation into an open ended housing 16 adapted for rapid assembly with a housing cap 17, wherein the cap 17 has a multiported construction for connecting the cartridge operationally with the requisite water inlet and outlets as an incident to cap installation onto the housing.

The filter cartridge 14 of the present invention beneficially uses, in the dual stage form, a compact and economical yet highly efficient reverse osmosis membrane of the so-called thin film or thin film composite type, such as those marketed by Filmtek Corp. of Minneapolis, Minn., and by Fluid Systems, Inc., a division of U.O.P., Inc., San Diego, Calif. This thin film membrane is used in combination with the prefilter which guards against premature degradation of the membrane upon contact with certain contaminants present in many water supplies, for example, such as chlorine and/or compounds thereof which may be added to prevent bacteria growth. This combination filter structure is advantageously integrated into a single unit adapted for rapid and easy installation and/or removal for replacement by simple slide-fit mounting within the housing 16 for the reverse osmosis unit.

The reverse osmosis water purification system 10 (FIG. 1) is generally conventional in the art to include the reverse osmosis unit 12 connected to receive an incoming feed water supply 18. In general terms, the reverse osmosis unit 12 functions in the presence of appropriate fluid pressures to produce a supply of relatively purified water for use in drinking, cooking, etc. This purified water supply is produced by removal of particulate and certain dissolved contaminants, wherein these removed constituents are concentrated within a reject or brine water supply. The purified water supply is normally coupled through an appropriate pure water conduit 20 for flow to and storage within a reservoir 22. Conversely, the reject or brine water supply is normally discharged via a drain conduit 24 or the like for flow to a suitable waste or drain site. The purified water supply within the reservoir is available for dispensing and use upon opening a faucet valve 26 or the like. In this regard, the reservoir 22 may include pneumatic or hydraulic pressure means for delivering the purified water to the faucet valve 26 when the faucet valve is opened, all in a matter known in the art and described, by way of example, in U.S. Pat. Nos. 4,834,873 and 4,776,952 which are incorporated by reference herein.

As shown in FIGS. 2 and 3, the reverse osmosis unit 12 comprises the upwardly open and generally cylindrical or canister shaped housing 16 adapted to receive the dual stage filter cartridge 14 embodying the novel features of the invention. The housing 16 includes mounting means such as externally formed threads 28 near the open upper end thereof for rapid and convenient removable connection into the housing cap 17 which is suitably connected to the various conduits of the purification system, as will be described in more detail. As shown in the drawings, this cap 17 includes an upper body 30 joined to a downwardly projecting cylindrical flange 31 having internal threads to permit reception of and connection to the housing 16. However, it will be understood that alternative removable connection structures for the housing 16 and the cap 17 may be used.

The dual stage filter cartridge 14 is designed for simple slide-fit, drop-in mounting into the housing 16 of the reverse osmosis unit 12. When the housing 16 is then fastened into the cap 17, incoming feed water from the feed water conduit 18 is confined for flow in series through the dual filter stages, as will be described, to produce the supply of purified water.

More particularly, the cap body 30 of the reverse osmosis unit 12 includes an inlet port 34 to which the feed water conduit 18 is suitably connected (FIGS. 2 and 3). The feed water flows during system operation through the inlet port 34 into an annular inlet chamber 36 defined cooperatively by the cap body 30 and an upper end of the filter cartridge 14. A generally cylindrical filter canister 38 is formed at an upper end of the cartridge to provide the first filter stage and opens upwardly to receive feed water within the inlet chamber 36. One or more seal members such as 0-rings 39 or the like are compressively seated between the interior of the housing 16 and the upper external end of the canister 38 to prevent feed water leakage about the canister exterior.

The filter canister 38 has a generally cup-shaped geometry to include a lower end wall 40. A central aperture 41 is formed in this end wall 40 to permit relatively tight slide-fit reception of a central support tube 42 which comprises a main support structure tying the dual filter stages together as a single unit. An adhesive may be used, if desired, to mount the canister securely onto the support tube. The support tube 42 includes an imperforate upper end region extending generally coaxially within the canister 38 and cooperating therewith to define a cylindrical filter cavity 44 of general annular cross section. An upper adaptor fitting 46 includes a lower plug seated within the upper end of the support tube 42 and also includes an outwardly radiating annular flange 48 extending into snug contact with an interior wall surface of the canister 38.

The flange 48 of the adapter fitting 46 includes multiple flow ports 50 to permit downward feed water flow from the inlet chamber 36 to the filter cavity 44. A selected filter medium 52 is encased within the filter cavity 44, wherein the filter medium is selected for attracting, removing, or reacting with one or more target contaminants from the feed water, in addition to filtering of particulate in accordance with the structural characteristics of the filter medium. In one preferred form of the invention, activated carbon is used as the filter medium to remove chlorine and compounds thereof from the feed water. Alternately, other filter media and/or combinations thereof can be used, such as oxidation reduction media as described in U.S. Pat. No. 4,642,192.

The second filter stage of the dual stage cartridge 14 is defined by a reverse osmosis membrane 54 mounted on the central support tube 42 at a position immediately below the canister 38. In this regard, the lower end wall 40 of the canister 38 includes a plurality of flow ports 56 for downward passage of the treated feed water to the reverse osmosis membrane 54. A sealing sleeve 57 is conveniently mounted about the juncture of the canister 38 and the membrane 54 to confine feed water flow endwise into the membrane. In this regard, as is known in the art, the reverse osmosis membrane 54 comprises a large plurality of membrane layers wrapped in an open-ended cylindrical configuration about the support tube 42, with the illustrative membrane 54 being conveniently constructed from a so-called thin film or thin film composite material which can be wrapped compactly yet provide a large overall surface area for contact with the feed water. When appropriate fluid pressures are maintained during system operation, the supply of relatively purified water is produced by migration in the radial direction ultimately for inward passage through a series of ports 58 in a lower end region of the support tube 42. The reject or brine water collects contaminants deposited between the membrane layers for exit flow from the lower end of the membrane 54.

In accordance with one primary aspect of the invention, the filter medium 52 within the canister 38 is selected for protection of the reverse osmosis membrane 54. More particularly, it is known that certain membrane materials such as thin film materials are subject to rapid deterioration and premature failure upon contact with specific chemical substances which may be present in the feed water supply. As one example, chlorine is often used as an additive in water systems to retard bacterial growth, but this chemical will cause rapid degradation of a thin film type membrane. The filter medium 52 within the canister 38 may thus be selected to remove chlorine from the feed water, and thereby permit a thin film membrane to be used. In this regard, such thin film membranes are often desired in view of their relatively high efficiency in the production of purified water at a relatively rapid rate.

In accordance with further aspects of the invention, the purified and reject water supplies are both routed to the top of the reverse osmosis unit 12 for discharge through the upper cap 17. With this simple upwardly open cylinder adapted for drop-in, slide-fit of the cartridge 14. The cartridge 14 can thus be installed and/or replaced as needed quickly and easily without concern for complex plumbing connections, etc. All plumbing connection with the cartridge 14 are achieved properly and in an easy, substantially fail-safe manner by simple re-installation of the cap 17 onto the housing 16.

More specifically, with continued reference to FIGS. 2 and 3, a lower end adaptor fitting 59 is seated within the lower end of the central support tube 42 to prevent intermixture between the reject and purified water supplies. One or more spacer legs 60 may be included on the fitting 59 to insure adequate spacing between the membrane 54 and the lower end of the housing 16. Alternately, such spacing may be insured by the use of spacer ribs formed on the bottom wall of the housing. Produced purified water within the support tube 42 is permitted to pass upwardly through the support tube 42 and further through the adaptor fitting 46 at the upper end of the canister 38. This upper adapter fitting 46 includes a tubular upper extension or probe 46' which projects into an outlet fitting 62 mounted within the cap body 30 and forming a portion of the cap 17. An inner bore 64 of the outlet fitting 62 provides an annular pure water outlet chamber 66 surrounding a segment of the extension 46', with appropriate discharge ports 68 permitting pure water flow to this outlet chamber 66 which is coupled in turn to the purified water conduit 20 extending through the cap body 30 for connection to a pure water outlet port 70 on the fitting 62.

The reject water supply at the lower end of the reverse osmosis membrane 54 is free to flow through a bleed conduit 72. A lower end of this bleed conduit 72 is carried by the adaptor fitting 59 at the lower end of the support tube 42, which mounts the bleed conduit to extend concentrically within the support tube 42 to an upper end connection with the adaptor extension 46'. The reject water supply flows further through a reject outlet port 74 on the outlet fitting 62 which is appropriately connected to the drain conduit 24.

The dual stage filter cartridge thus provides a unitary structure adapted for rapid and simple drop-in mounting within the reverse osmosis housing 16. The cartridge provides combination filtering reverse osmosis action which can be coordinated to permit use of special membrane materials in an otherwise hostile environment.

Figure 4:
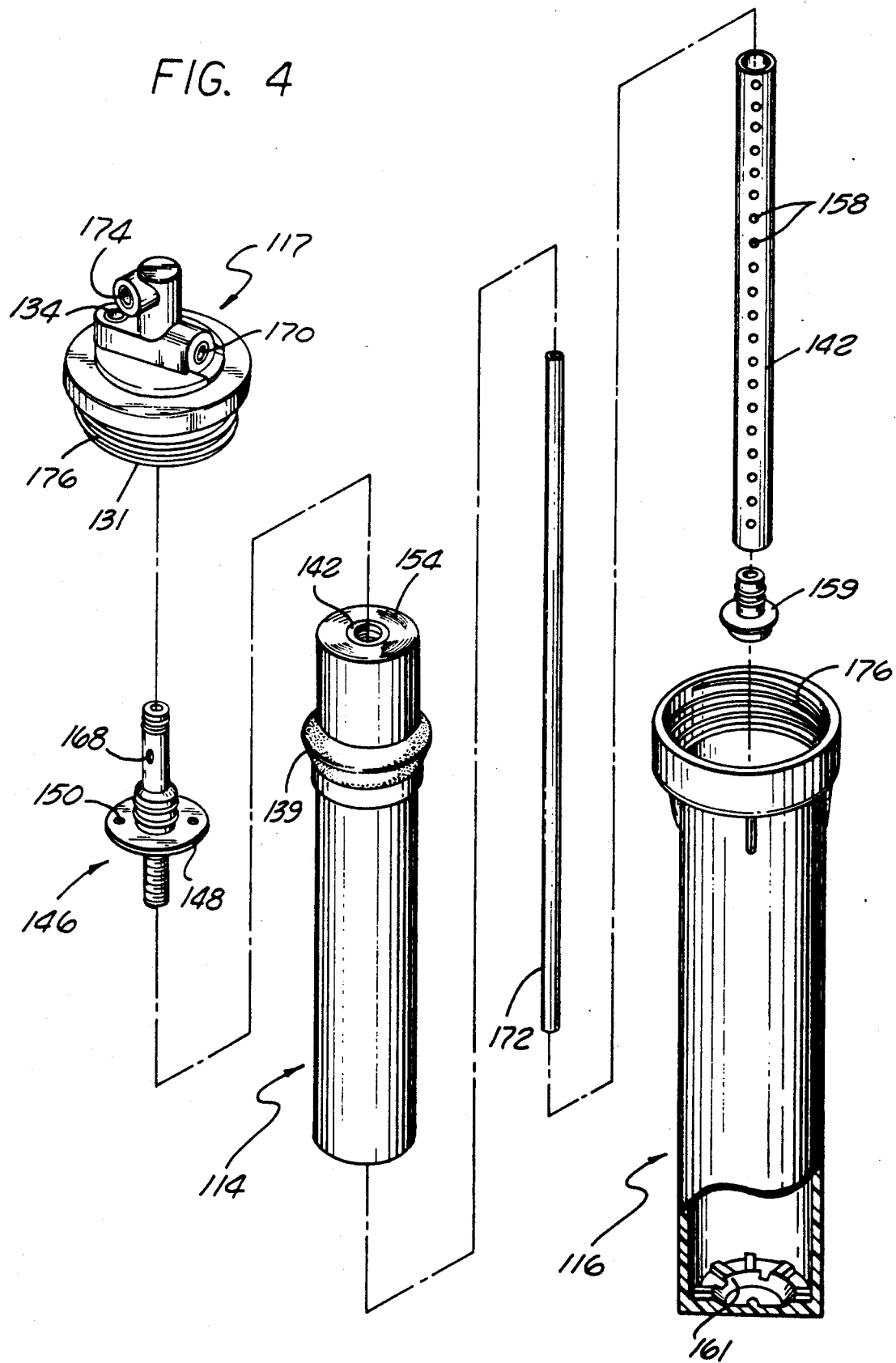
FIG. 4 is an exploded perspective view depicting an alternative preferred form of the invention having a single stage filter cartridge for operative association with a unitary, multiported housing cap.
Figure 5:
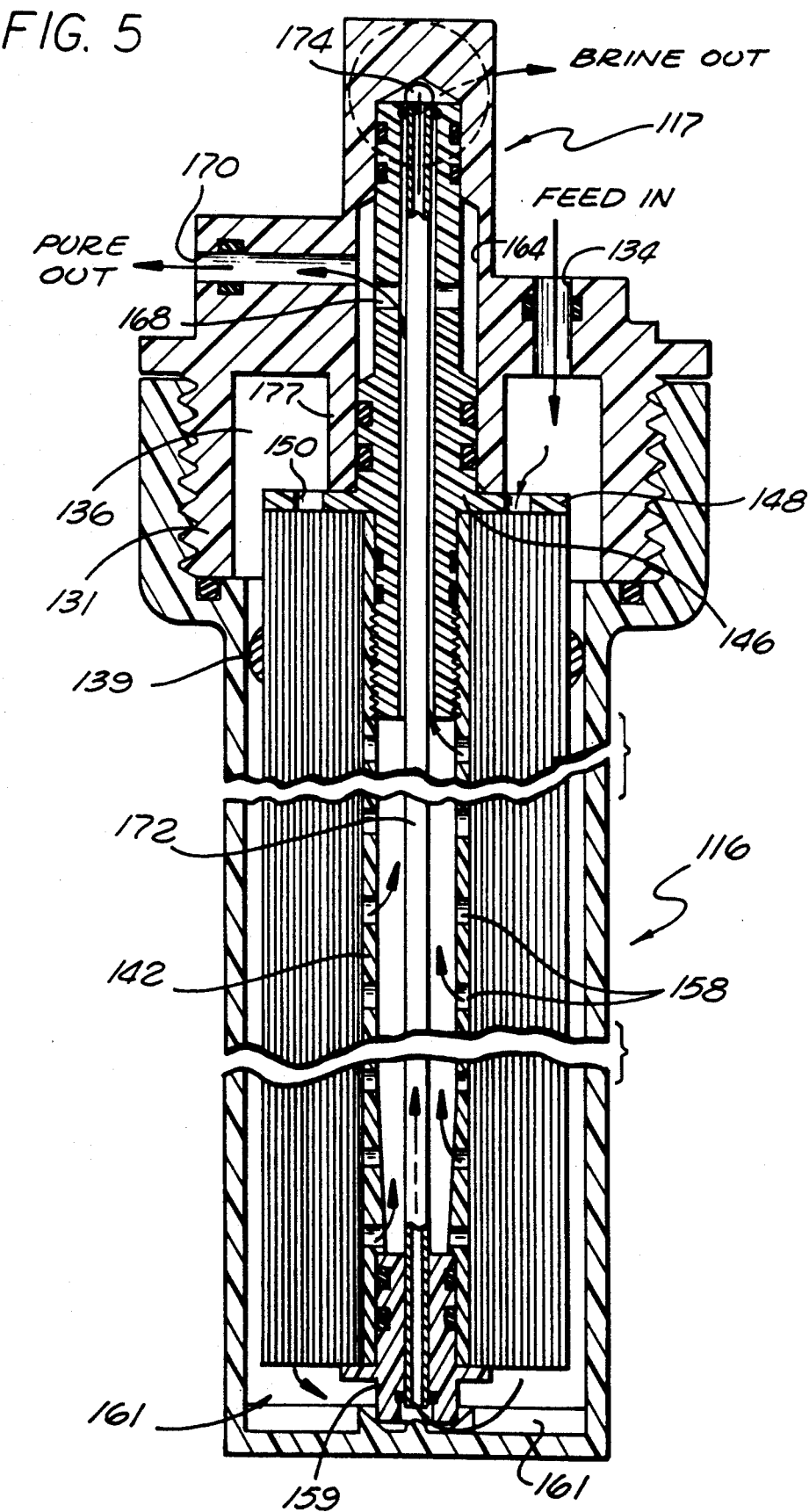
FIG. 5 is a fragmented vertical sectional view illustrating the embodiment of FIG. 4 in assembled form.

FIGS. 4 and 5 depict an alternative preferred form of the invention, wherein a modified housing cap 117 is provided for simple screw-on mounting onto a canister like, open-ended cylindrical housing 116 adapted for slide-fit reception of a filter cartridge 114. In the embodiment of FIGS. 4 and 5, the housing cap 117 corresponds functionally with the cap 17 as previously described, differing only with respect to the formation of the modified cap 117 as a unitary plastic molding. In addition, the filter cartridge 114 shown in FIGS. 4 and 5 is depicted as a single stage cartridge having an elongated reverse osmosis membrane 154, although it will be appreciated that a single or dual stage cartridge may be used with the multiported cap of either preferred embodiment.

More specifically, the modified filter cartridge 114 (FIGS. 4 and 5) includes the cylindrically elongated reverse osmosis membrane 154 consisting of a large plurality of membrane material layers wrapped and mounted about a central support tube 142 having radially open perforations 158 formed therein. An outer seal ring 139 near the upper end of the membrane 154 engages the interior of the housing 116 to prevent water bypass flow around the exterior of the membrane. A lower end adapter fitting 159 is mounted into the lower end of the support tube 142, and an upper end adapter fitting 146 has a threaded base rotatably connected into the upper end of the support tube 142. Seal rings such as 0-rings or the like are normally provided with both adapter fittings 146 and 159 to prevent undesired water leakage between the adapter fittings and the central support tube.

The upper adapter fitting 146 further includes a radially enlarged flange 148 which generally overlies the upper end of the membrane 154 and has apertures 150 formed therein. These apertures 150 permit flow of feed water from a feed water chamber 136 downwardly and longitudinally to the reverse osmosis membrane 154. Once again, as is known in the art, operation of the system at certain pressure conditions causes the membrane to separate the feed water inflow into a relatively purified water supply passed through the holes 158 into the central support tube 142, and a relatively impure or reject water supply passed longitudinally through the membrane 154 to a small chamber 161 defined at a lower end of the membrane by the lower adapter fitting 159 engaging upstanding ribs 160 at the bottom or closed end of the housing 116.

The reject water supply is passed from the lower chamber 161 through the central support tube 142 to the upper adapter fitting 146, by means of a small bleed tube 172 mounted within the support tube 142. Seal rings such as O-ring seals or the like seat the opposite ends of the bleed tube 172 respectively within the upper and lower adapter fittings 146 and 159 to prevent mixing of the purified and reject water supplies.

In accordance with one primary aspect of the invention, the unitary housing cap 117 defines water flow ports for simple operational connection to the cartridge 114 by simple assembly of the cap 117 with the cartridge housing 116. Complex plumbing connections are thus entirely avoided, and the cartridge is automatically coupled to the associated water flow paths for correct operation, substantially in a fail-safe manner.

More particularly, the upper end of the cylindrical housing 116 is shown to have an expanded radial size and to include internal threads 175. The housing cap 117, formed conveniently and economically as a one-piece plastic molding, includes an outer cylindrical rim 131 with external threads 176 for thread-in connection into the upper end of the housing 116. A central region of the housing cap is shaped to extend over and close the upper end of the housing 116, wherein said cap central region defines a stepped vertical bore 164 adapted to receive an upper end of the upper adapter fitting 146. A lower portion of the stepped bore 164 is defined by an inner cylindrical rim 177 on the cap to contact the adapter fitting flange 148 for purposes of holding the cartridge in a seated position within the housing 116.

The stepped bore 164 formed within the housing cap 117 has an enlarged lower end region into which the purified water supply can flow via ports 168 formed in the adapter fitting 146. These ports 168 permit purified water flow further to a pure water outlet 170 formed in the cap 117 and adapted for connection to the pure water conduit 20 (FIG. 1). A narrower upper end region of the stepped bore 164 sealingly receives the upper end of the adapter fitting 146, and thereby permits flow of the reject water supply through the bleed tube 172 to a reject water outlet 174 formed in the cap 117. This reject outlet 174 is adapted for connection to the drain conduit 24 (FIG. 1). Finally, a feed water inflow port 134 is formed in the cap 117 for coupling feed or tap water from the feed supply conduit 18 (FIG. 1) to the feed chamber 136 defined at the top of the cartridge 114 when the cap 117 is assembled with the housing 116.

In the embodiment of FIGS. 4 and 5, periodic replacement of the filter cartridge 114 is accomplished quickly and easily by mere unthreading of the housing 116 from the multiported cap 117 for removal therefrom. The cartridge 114 is thus exposed for simple slide-out removal from the housing 116 and slide-in replacement with a fresh cartridge. The housing 116 is then threadably re-connected to the cap 117 for operationally connecting the cartridge 114 to the requisite water flow ports.

A variety of further modifications and improvements to the dual stage filter cartridge of the present invention will be apparent to those skilled in the art. Accordingly, no limitation on the invention is intended by way of the foregoing description and accompanying drawings, except as set forth in the appended claims.

What is claimed is:

1. A reverse osmosis unit for a water purification system, comprising:
an elongated housing having an open end and an opposite closed end;
a filter cartridge for slide-in reception into and slide-out removal from said housing, said filter cartridge including first and second opposite ends, a perforated central support tube extending between said first and second opposite ends, a reverse osmosis membrane carried about said central support tube, first and second adapter fittings mounted respectively at opposite ends of said support tube, and a bleed conduit having opposite ends supported by said first and second adapter fittings and extending therebetween through said support tube; and
a cap including a feed water inflow port, a pure water outlet port, and a reject water outlet port, said cap and said housing including means for removably mounting said housing onto said cap so that said cap is mounted over and closes said open end of said housing, said means for removably mounting said housing onto said cap permitting manual separation of said housing from said cap to correspondingly permit slide-out removal of said filter cartridge from said housing and slide-fit installation of a replacement filter cartridge into said housing;
said filter cartridge cooperating with said housing and cap to define a generally annular feed water chamber disposed at said first end of said filter cartridge when said filter cartridge is positioned within said housing and said housing is mounted on said cap, said feed water chamber being in flow communication with said feed water inflow port whereby feed water inflow to said feed water chamber flows to and through said reverse osmosis membrane, said reverse osmosis membrane separating the feed water into a purified water supply for flow into the interior of said central support tube and a reject water support for flow through said membrane to said second end of said filter cartridge;
said filter cartridge and said housing cooperatively defining slide-fit seal means for preventing bypass flow of feed water relative to said reverse osmosis membrane;

said second adapter fitting cooperating with said housing closed end to define a reject water chamber disposed generally at said second end of said filter cartridge when said filter cartridge is positioned within said housing, said second adapter fitting including port means for communicating said reject water chamber with said bleed conduit;
said first adapter fitting defining a pure water flow path in flow communication with the interior of said central support tube for receiving the purified water supply, said bleed conduit extending through said pure water flow path, and means for preventing cross-flow of the purified and reject water between said pure water flow path and said bleed conduit;
said cap further including a stepped bore formed therein, said stepped bore having a first portion in flow communication with said pure water outlet port and a second portion in flow communication with said reject water outlet port;
said first adapter fitting including a slide-fit probe for slide-fit reception into said stepped bore in said cap when said housing having said filter cartridge therein is mounted onto said cap, said slide-fit probe being received into said stepped bore with said pure water flow path in flow communication with said bore first portion and said bleed conduit in flow communication with said bore second portion, said first adapter fitting and said cap further cooperatively defining slide-fit seal means for sealing said feed water chamber from said pure water flow path, and for sealing said pure water flow path from said reject water outlet port.

2. The reverse osmosis unit of claim 11 wherein means for removably mounting said housing onto said cap comprises interengageable threads, whereby said housing is threadably engageable with and disengageable from said cap.

3. The reverse osmosis unit of claim 1 wherein said cap has a unitary construction.

4. The reverse osmosis unit of claim 1 wherein said slide-fit seal means cooperatively defined by said filter cartridge and said housing comprises a seal ring mounted about said reverse osmosis membrane.

5. The reverse osmosis unit of claim 1 wherein said first adapter fitting further includes a nipple threadably connected to said central support tube.

6. The reverse osmosis unit of claim 1 wherein said first adapter fitting further includes a perforated flange projecting radially outwardly from said slide-fit probe, said flange overlying said reverse osmosis membrane at said one end of said filter cartridge, and permitting flow of feed water from said feed water chamber to said reverse osmosis membrane.

7. The reverse osmosis unit of claim 1 wherein said first portion of said stepped bore has a larger cross sectional size than said second portion.

8. A reverse osmosis unit for a water purification system, comprising:
an elongated housing having an open end and an opposite closed end;
a cap including a feed water inflow port, a pure water output port, and a reject water outlet port, said cap having an inner side with a stepped bore formed therein, said stepped bore having a first portion in flow communication with said pure water outlet port and a second portion in flow communication with said reject water outlet port, said cap further defining a generally annular feed water chamber at said cap inner side in flow communication with said feed water inflow port;

said housing and said cap including cooperating mounting means for removably mounting said housing onto said cap to permit manual separation of said housing from said cap and manual reinstallation of said housing onto said cap; and a filter cartridge for slide-fit reception into and slide-out removal from said housing, said filter cartridge including a reverse osmosis membrane carried about a perforated central support tube, a first adapter fitting mounted on said support tube at one end thereof, a second adapter fitting mounted on said support tube at an opposite end thereof, and a bleed conduit supported by said first and second adapter fittings to extend therebetween;

said filter cartridge being received into said housing and enclosed therein when said housing is mounted onto said cap, with one end of said reverse osmosis membrane exposed to said feed water chamber to permit flow of feed water through said membrane for separation into a purified water supply communicated to the interior of said central support tube and a reject water supply communicated to an opposite end of said membrane;

said second adapter fitting supporting said bleed conduit in flow communication with the reject water supply at said membrane opposite end;

said first adapter fitting including a slide-fit probe for slide-fit reception into said cap stepped bore and including means for coupling the interior of said support tube in flow communication with said bore first portion and for coupling the bleed conduit to said bore second portion.

* * * * *